United States Patent
Lee et al.

(10) Patent No.: US 8,649,833 B1
(45) Date of Patent: Feb. 11, 2014

(54) CONDUCTIVE STRUCTURE FOR USE AS SENSOR PAD AND ANTENNA

(75) Inventors: Cheng-Jung Lee, Santa Clara, CA (US);
Michael M. Lee, San Jose, CA (US);
Mark Corbridge, Los Gatos, CA (US);
Nagendra Bage Jayaraj, Sunnyvale, CA (US); Khaled Ahmad Obeidat, Santa Clara, CA (US); Joseph C. Modro, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 26 days.

(21) Appl. No.: 13/429,132

(22) Filed: Mar. 23, 2012

Related U.S. Application Data (60) Provisional application No. 61/510,939, filed on Jul. 22, 2011.

(51) Int. Cl.
*H04M 1/00* (2006.01)

(52) U.S. Cl.
USPC ................................ 455/575.7; 455/82

(58) Field of Classification Search
USPC ............ 340/572.7; 343/702, 720; 455/19, 82, 455/562.1, 575.7
See application file for complete search history.

(56) References Cited

U.S. PATENT DOCUMENTS

| | | | | |
|---|---|---|---|---|
| 5,983,119 | A * | 11/1999 | Martin et al. | 455/575.7 |
| 7,492,254 | B2 * | 2/2009 | Bandy et al. | 340/540 |
| 8,106,836 | B2 * | 1/2012 | Hill et al. | 343/702 |
| 2007/0008235 | A1 * | 1/2007 | Tsukahara et al. | 343/788 |
| 2008/0204240 | A1 * | 8/2008 | Hilgers et al. | 340/572.1 |
| 2013/0135171 | A1 * | 5/2013 | Desclos et al. | 343/852 |

* cited by examiner

*Primary Examiner* — Sonny Trinh
(74) *Attorney, Agent, or Firm* — Lowenstein Sandler LLP (57) ABSTRACT

A user device includes a conductive structure coupled to a receiver and a sensor. The conductive structure is configured to operate as an antenna for the receiver and as a sensor pad for the sensor.

22 Claims, 9 Drawing Sheets

CONDUCTIVE STRUCTURE FOR USE AS SENSOR PAD AND ANTENNA

RELATED CASES

This patent application claims the benefit under 35 U.S.C. §119(e) of U.S. Provisional Application No. 61/510,939, filed Jul. 22, 2011, which is herein incorporated by reference.

BACKGROUND OF THE INVENTION

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

Many user devices additionally include a global positioning system (GPS) receiver to enable the user devices to accurately identify a current location of the user device and to help a user of the user device navigate. Such user devices include an additional antenna connected to the GPS receiver in order to receive GPS signals from GPS satellites.

Many user devices also include proximity sensors to enable the user devices to detect objects such as a user's body (e.g., a user's hand or leg). Such user devices include one or more sensor pads to enable the proximity sensors to detect objects.

Wireless communication antennas (e.g., Wireless Fidelity (WiFi) antennas, GSM antennas, etc.), GPS antennas and sensor pads all use considerable space within user devices. Therefore, devices that include some or all of these components may have restrictions regarding a minimum device size or additional components that can be included.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

A conductive structure that can operate both as a sensor pad for a proximity sensor and as an antenna for a receiver or transceiver is described. Additionally, a user device that incorporates such a conductive structure is described. A method for concurrently receiving two different signals on the same conductive structure without having either signal interfere with the other signal is also described. In one embodiment, a user device includes a global positioning system (GPS) receiver, a proximity sensor and a conductive structure coupled to the GPS receiver and to the proximity sensor. The conductive structure is configured to operate as an antenna for the GPS receiver and as a sensor pad for the proximity sensor. Thus the conductive structure may simultaneously receive a GPS signal and a proximity sensor signal. The conductive structure may then send the GPS signal to the GPS receiver without including any portion of the proximity sensor signal. Therefore, the proximity sensor signal does not interfere with the GPS signal. Similarly, the conductive structure may send the proximity sensor signal to the proximity sensor without including any portion of the GPS signal. Therefore, the GPS signal does not interfere with the proximity sensor signal.

By using a single conductive structure as both an antenna and as a sensor pad, space is freed within a user device. This may enable engineers to produce smaller user devices and/or to add additional components to the user devices. Additionally, using the single conductive structure as an antenna and as a sensor pad may reduce the cost of manufacturing the user device.

Embodiments of the present invention are described with reference to a conductive structure that couples to a proximity sensor and/or to a GPS receiver. However, it should be understood that embodiments of the present invention are also applicable to a conductive structure that couples to any two electronic components, where a first electronic component operates using signals in a kHz or lower frequency range and a second electronic component operates using signals in a MHz or GHz frequency range. Accordingly, it should be understood that wherever a proximity sensor is discussed herein, the proximity sensor may be substituted with any other electronic component that operates in the kHz frequency range or below (e.g., an AM radio receiver). Similarly, it should be understood that wherever a GPS receiver is discussed herein, the GPS receiver may be substituted with any other electronic component that operates in the MHz or GHz frequency range (e.g., with a frequency modulated (FM) radio receiver, a WiFi receiver, a global system for mobile communications (GSM) receiver, other wireless receivers, and so on).

Figure 1:
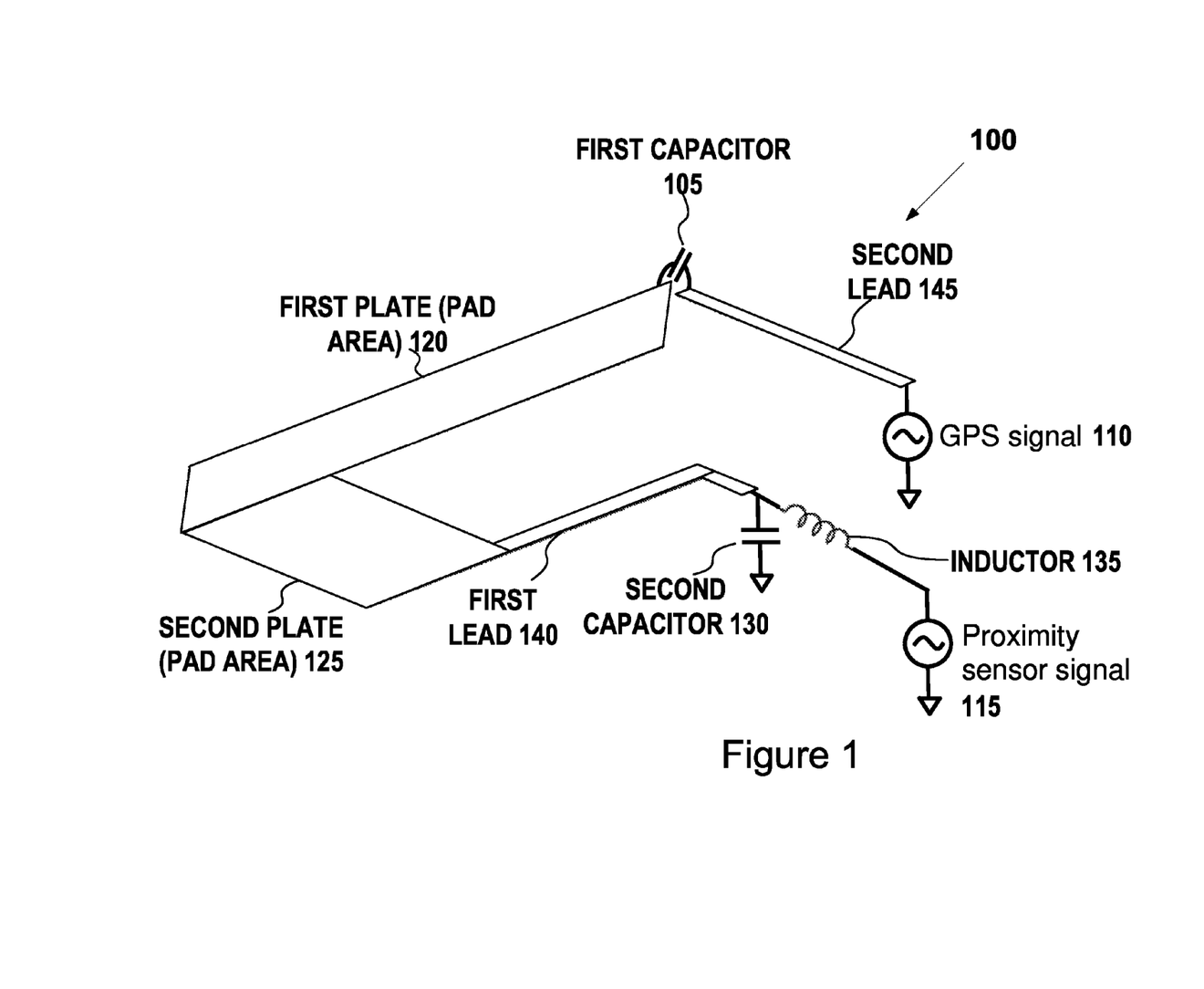
FIG. 1 illustrates a perspective view of a conductive structure that can operate as both a sensor pad and an antenna, in accordance with one embodiment of the present invention.

FIG. 1 illustrates a perspective view of a conductive structure 100 that can operate as both a sensor pad and an antenna, in accordance with one embodiment of the present invention. The conductive structure 100 includes a first plate 120 (also referred to as a first pad area), a second plate 125 (also referred to as a second pad area) and a first lead 140. The conductive structure 100 further includes a first capacitor 105 and a second lead 145 that couple the conductive structure 100 to a GPS signal input/output 110. Additionally, the conductive structure 100 includes a second capacitor 130 that couples the conductive structure 100 to ground and an inductor 135 that couples the conductive structure 100 to a proximity sensor signal input/output 115.

GPS satellites broadcast GPS signals at the frequencies of 1.57542 gigahertz (GHz) and 1.2276 GHz. Conductive structure 100 may be configured to receive signals at these frequencies. In one embodiment, conductive structure 100 is configured so that the conductive structure has resonant frequencies at one or both of 1.575 GHz and 1.2276 GHz.

In one embodiment, the inductor 135 has an inductance that causes the inductor 135 to appear as an open circuit to signals having frequencies at the megahertz (MHz) frequency range and/or the MHz or GHz frequency range (e.g., to the GPS signals). Therefore, GPS signals or other signals having frequencies at the GHz range will not pass through (e.g., will be blocked by) the inductor 135, and thus will not be received by the proximity sensor signal input/output 115. The inductor 135 may also have an inductance that causes the inductor to operate as a short (closed circuit) to signals having frequencies in the kilohertz (kHz) frequency range. Therefore, the inductor 135 may pass signals having frequencies in the kHz frequency range and below to the proximity sensor input/output 115. In one embodiment, the inductor 135 has an inductance that is greater than approximately 22 nH. In one exemplary embodiment, the inductor has an inductance of 150 nH.

In one embodiment, the first capacitor 105 and the second capacitor 130 have capacitances that cause the first capacitor 105 and the second capacitor 130 to appear as shorts to signals having frequencies in the MHz frequency range and/or the GHz frequency range (e.g., to the GPS signals). Therefore, for GPS signals and other signals with MHz or GHz frequencies (e.g. FM radio signals, ham radio signals, WiFi signals, GSM signals, etc.), one end of the conductive structure 100 is grounded and the other end of the conductive structure 100 is coupled to the GPS signal input/output 110. Thus, the first capacitor 105 may pass signals in the MHz to GHz frequency ranges to the GPS signal input/output 110 (or to another receiver such as a wireless receiver). The first capacitor 105 and second capacitor 130 may also have capacitances that operate as open circuits for signals having frequencies in the kHz frequency range. Thus, the first capacitor 105 and second capacitor 130 may block signals in the kHz frequency range. In one embodiment, the first capacitor 105 has a capacitance from approximately 0.2 picofarad (pF) to 1.0 pF. In one embodiment, the second capacitor 130 has a capacitance from approximately 2 pF to 33 pF. In one exemplary embodiment, the first capacitor has a capacitance of 0.5 pF and the second capacitor has a capacitance of 15 pF.

It should be understood that the provided capacitance ranges and inductance ranges for the capacitors 105, 130 and inductor 135 are just example ranges. Other capacitance ranges and inductance ranges can also be used, such as capacitance ranges above the discussed capacitance ranges. The capacitance ranges and inductance ranges may depend on the frequencies of signals that are to be isolated by the capacitors and inductors.

Figure 2:
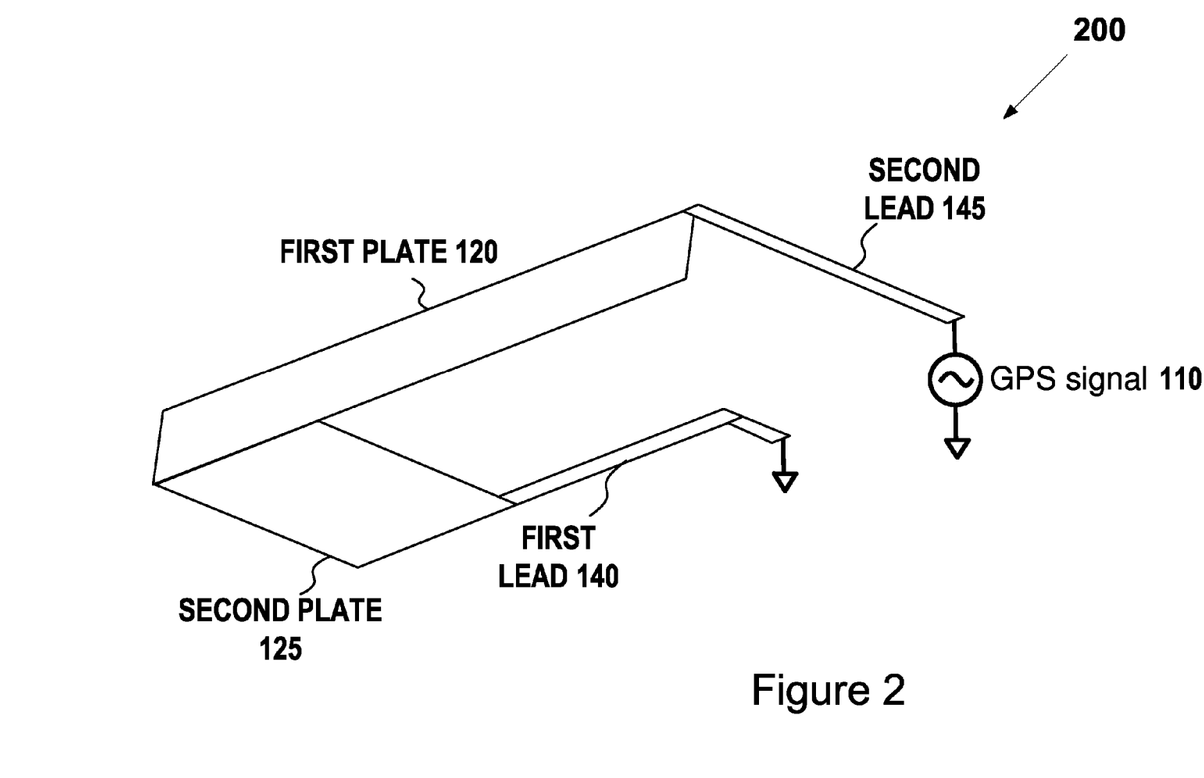
FIG. 2 illustrates a perspective view showing the effective structure of the conductive structure of FIG. 1 for a GPS signal.

FIG. 2 illustrates a perspective view showing the effective structure 200 of the conductive structure 100 of FIG. 1 for a GPS signal or other signal in the GHz or MHz frequency range. At the GPS signal frequencies, the capacitors act as short circuits and the inductor acts as an open circuit. Therefore, one end of the effective structure 200 connects to ground and the other end of the effective structure 200 connects to GPS signal input/output 110, causing the effective structure 200 of the conductive structure 100 to be a loop antenna.

Returning to FIG. 1, in one embodiment, the proximity sensor signal input/output 115 is a component of a proximity sensor that has an operational frequency in the KHz frequency range. In one embodiment, the proximity sensor is a capacitive sensor. In such an embodiment, the first plate 120 and the second plate 125 act as an electrode of a plate capacitor. A corresponding third plate is represented by the environment surrounding the plates 120, 125 and a conductive object such as a user's hand. The larger the first plate 120 and the second plate 125 (and thus the larger the area of the electrode plate), the higher the capacitance and thus the sensitivity of the proximity sensor. In one embodiment, the first plate 120 and the second plate 125 each have a surface area of approximately 50-100 mm$^2$ or larger. In one embodiment, the first plate 120 is perpendicular to the second plate 125. This enables the proximity sensor to sense the approach of objects from two different directions. In another embodiment, one or both of the first plate 120 and the second plate 125 may be curved to sense the approach of objects from multiple different directions. Alternatively, the first plate 120 and second plate 125 may be combined into a single curved plate that can sense the approach of objects from multiple different directions. Additionally, the first plate 120 and second plate 125 may be at non-ninety degree angles to one another (e.g., 60 degree angle, 30 degree angle, etc.).

The proximity sensor places a signal onto the conductive structure 100 at a frequency of around a kHz. The proximity sensor then detects changes in capacitance using any of the various measurement techniques known in the art. Examples of such measurement techniques include relaxation oscillation, a current verses voltage phase shift comparison, resistor-capacitor charge timing, capacitive bridge division, charge transfer, sigma-delta modulation, or charge-accumulation. The proximity sensor may also be another type of sensor, such as one that operates using the detection principles of resistive (e.g., analog resistive, digital resistive or residual resistive), surface acoustic wave, electromagnetic, near field imaging, or other technologies.

In one embodiment, the first capacitor 105 and the second capacitor 130 have capacitances that cause the first capacitor 105 and the second capacitor 130 to appear as open circuits to signals having frequencies in the kHz frequency range. Therefore, proximity sensor signals will not be received by the GPS signal input/output 110.

In one embodiment, the inductor 135 has an inductance that causes the inductor 135 to appear as a short circuit to signals having frequencies at the kHz range (e.g., to the proximity sensor signals). Therefore, proximity sensor signal input/output 115 may place proximity sensor signals onto the conductive structure 100, and receive proximity sensor signals from the conductive structure 100.

Figure 3:
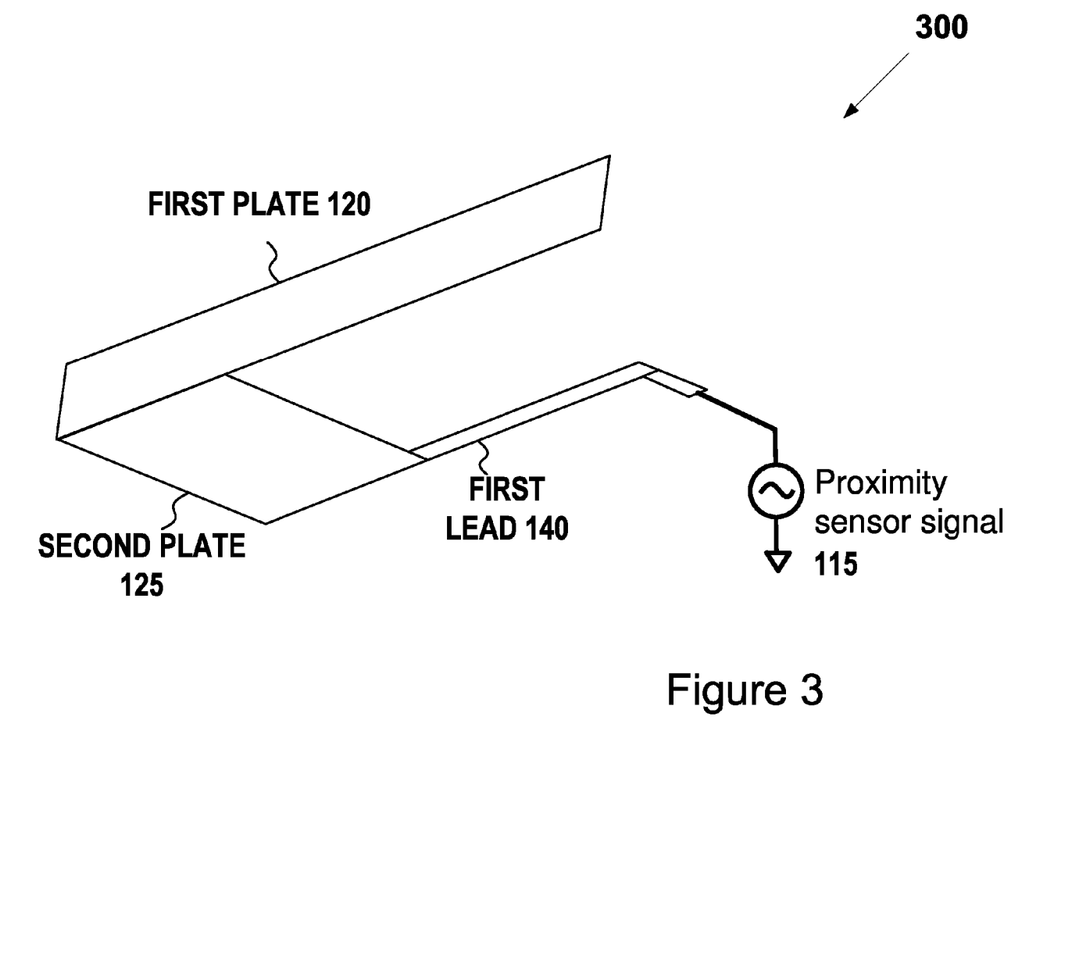
FIG. 3 illustrates a perspective view showing the effective structure of the conductive structure of FIG. 1 for a proximity sensor signal.

FIG. 3 illustrates a perspective view showing the effective structure 300 of the conductive structure 100 of FIG. 1 for a proximity sensor signal or other signal in the kHz frequency range. At the proximity sensor signal frequencies, the capacitors act as open circuits and the inductor acts as a short circuit. Therefore, the effective structure 300 is not grounded, and connects to proximity sensor signal input/output 115, causing the effective structure 300 of the conductive structure to be a sensor pad.

Figure 4:
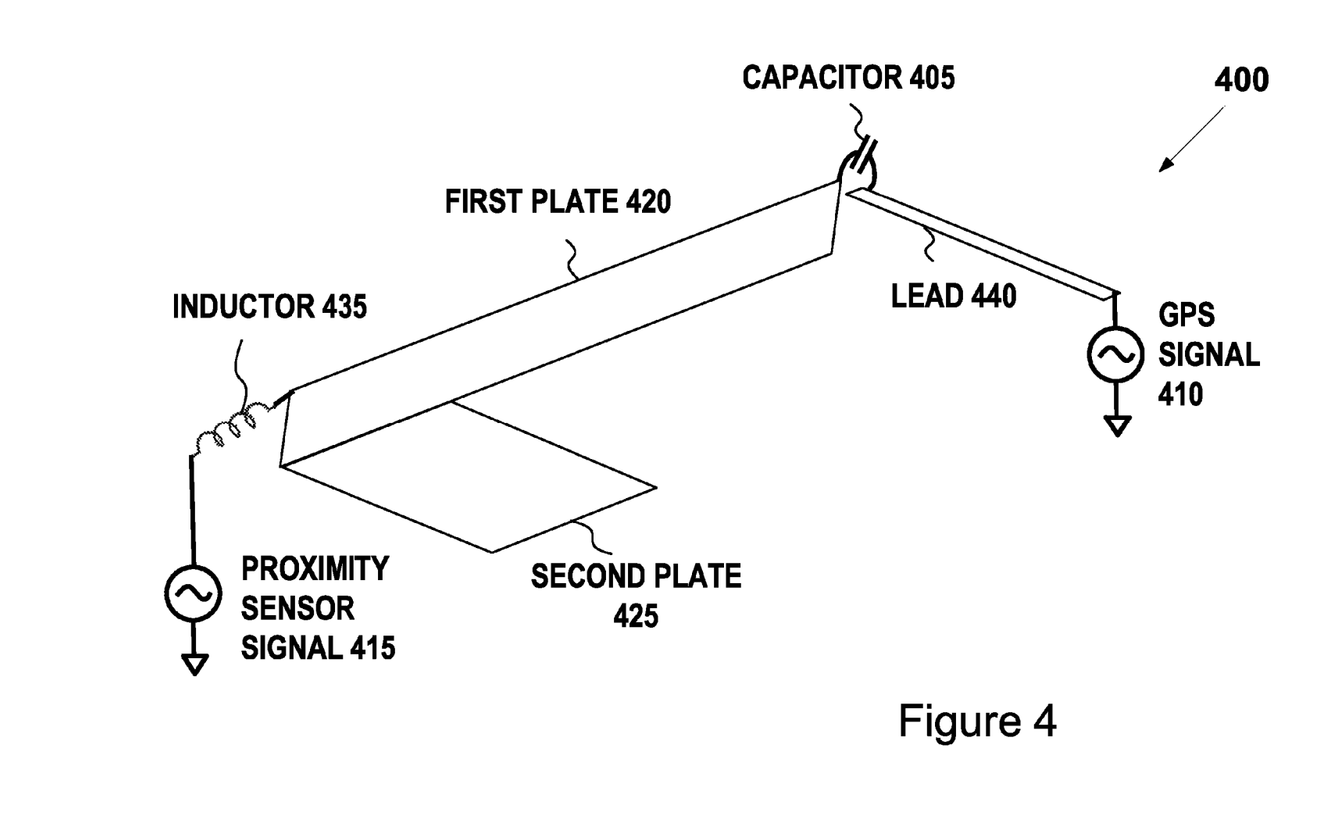
FIG. 4 illustrates a perspective view of a conductive structure that can operate as both a sensor pad and an antenna, in accordance with another embodiment of the present invention.

FIG. 4 illustrates a perspective view of a conductive structure 400 that can operate as both a sensor pad and an antenna, in accordance with another embodiment of the present invention. The conductive structure 400 includes a first plate 420 and a second plate 425. The conductive structure 400 further includes a capacitor 405 and a lead 440 that couple the conductive structure 400 to a GPS signal input/output 410. Additionally, the conductive structure 400 includes an inductor 435 that couples the conductive structure 400 to a proximity sensor signal input/output 415.

In one embodiment, the inductor 435 has an inductance that causes the inductor 435 to appear as an open circuit to signals having frequencies at the MHz range and/or the GHz range (e.g., to the GPS signals) and as a short circuit to signals having frequencies in the kHz range (e.g., to proximity sensor signals). In one embodiment, the inductor 135 has an inductance that is greater than approximately 22 nanohenries (nH). In one embodiment, the capacitor 405 has a capacitance that causes the capacitor 405 to appear as a short circuit to signals having frequencies in the MHz frequency range and/or the GHz frequency range and as an open circuit to signals having frequencies in the kHz range. In one embodiment, the capacitor 405 has a capacitance from approximately 0.2 pF to 1.0 pF.

At GPS signal frequencies, the capacitor 405 effectively becomes a short circuit and the inductor 435 effectively becomes an open circuit. This causes the conductive structure 400 to become a monopole antenna at GPS frequencies. At proximity sensor signal frequencies, the capacitor 405 effectively becomes an open circuit and the inductor 435 effectively becomes a short circuit. This causes the conductive structure 400 to become a sensor pad at proximity sensor signal frequencies.

Figure 5:
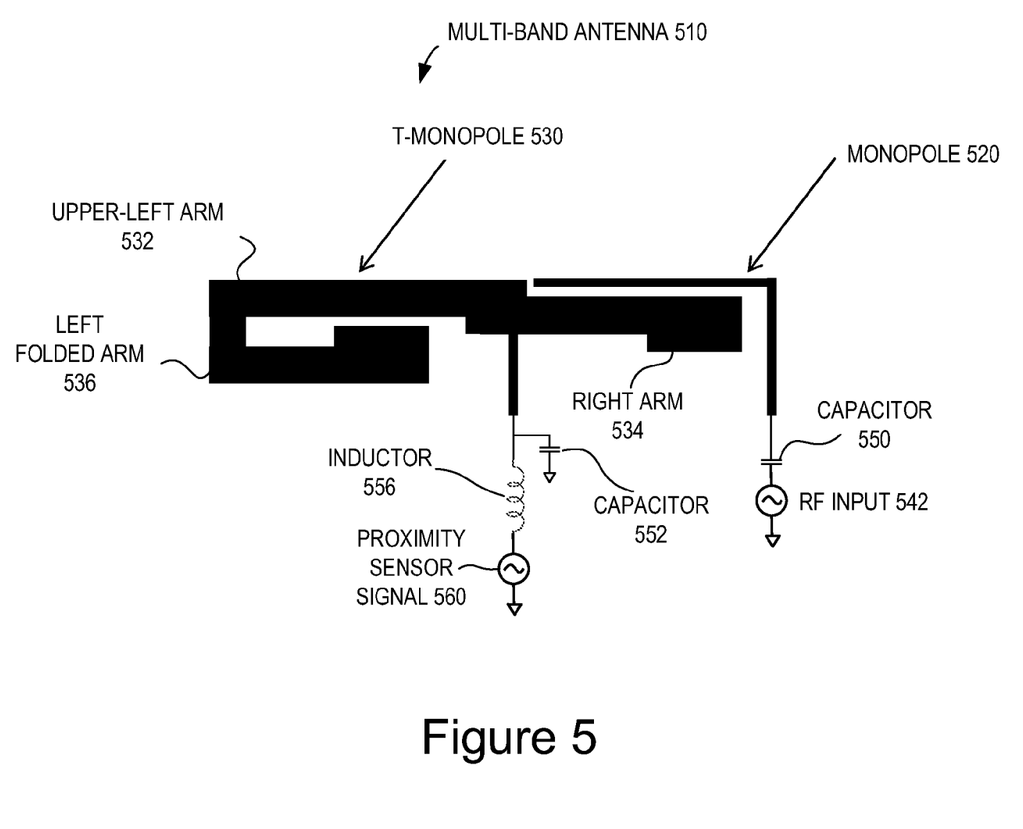
FIG. 5 illustrates a multi-band antenna that can also act as a sensor pad for a proximity sensor, in accordance with another embodiment of the present invention.

FIG. 5 illustrates one embodiment of a multi-band antenna 510 that can act as one or more sensor pads for a proximity sensor. In one embodiment, the multi-band antenna includes a T-monopole antenna 530 and a monopole antenna 520. However, the multi-band antenna 510 could alternatively include a loop antenna and a monopole antenna, a loop antenna and a T-monopole antenna, or other configurations. In one embodiment, the multi-band antenna 510 is configured to receive radio signals for wireless communication in wireless bands between 824 MHz and 960 MHz (3G bands), as well as wireless bands between 700 MHz and 787 MHz (LTE bands).

In one embodiment, the multi-band antenna 510 is attached to a single RF input 542 at the monopole antenna 520 via a capacitor 550. The capacitor 550 may have a capacitance that causes the capacitor to act as a short circuit for signals having MHz frequencies and as an open circuit for signals having kHZ frequencies.

The T-monopole antenna 530 may be a parasitic element, and may be connected to ground via a capacitor 552. The capacitor 552 may also have a capacitance that causes the capacitor to act as a short circuit for signals having MHz frequencies and as an open circuit for signals having kHZ frequencies. T-monopole antenna 530 is parasitic because it is not physically coupled to, or is physically separated from, the monopole antenna 520 that is driven at the single RF input 542. The driven monopole antenna 520 parasitically excites the current flow of the T-monopole antenna 530. The T-monopole antenna 530 and monopole antenna 520 can be separated by a gap. The dimensions of the monopole and T-monopole antennas 520 and 530 may be varied to achieve the desired frequency range as would be appreciated by one of ordinary skill in the art having the benefit of this disclosure, however, the total length of the antennas is a major factor for determining the frequency, and the width of the antennas is a factor for impedance matching.

In one embodiment, the multi-band antenna 510 has four resonate modes. The upper-left arm 532 of the T-monopole antenna 530 creates the first resonate mode at 700 MHz in a low band. The right arm 534 of the T-monopole antenna 530 creates the second resonate mode at 850 MHz in the low band. The left folded arm 536 of the T-monopole antenna 530 creates the third resonate mode at 1860 MHz in a high band. The monopole 520 creates the fourth resonate mode at 2110 MHz in the high band.

In one embodiment, T-monopole antenna 530 is connected to a proximity sensor signal input/output 560 via an inductor 556. Inductor 556 may have an inductance that causes inductor 556 to behave as a short circuit at kHz frequencies and to behave as an open circuit at MHz frequencies. Therefore, the T-monopole antenna 530 may act as a sensor pad for a proximity sensor at the same time as acting as a wireless communication antenna. This may enable the multi-band antenna to be used to detect the presence of a human body part (e.g., a hand). Based on this detection, a user device that includes the multi-band antenna may then reduce a transmit power level to reduce radiation exposure to the human body part.

Figure 6:
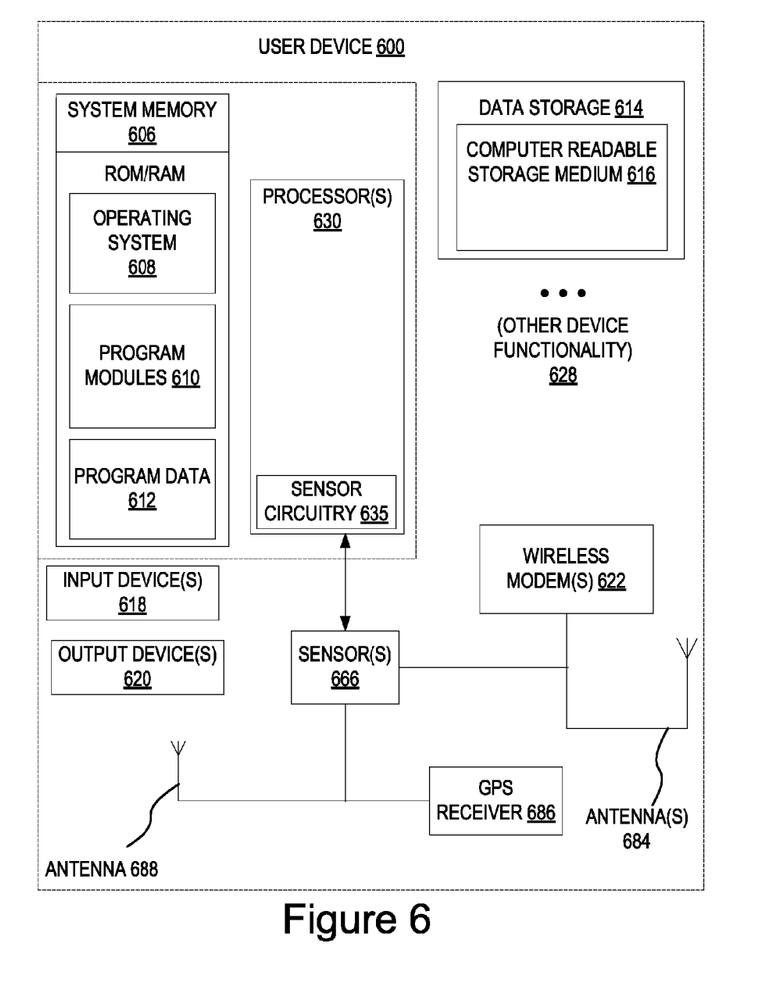
FIG. 6 is a block diagram illustrating an exemplary user device, in accordance with one embodiment of the present invention.

FIG. 6 is a block diagram illustrating an exemplary user device 600, in accordance with one embodiment of the present invention. The user device 600 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 600 includes one or more processors 630, such as one or more CPUs, microcontrollers, field programmable gate arrays, or other types of processors. The user device 600 also includes system memory 606, which may correspond to any combination of volatile and/or non-volatile storage mechanisms. The system memory 606 stores information which provides an operating system component 608, various program modules 610, program data 612, and/or other components. The user device 600 performs functions by using the processor(s) 630 to execute instructions provided by the system memory 606.

The user device 600 also includes a data storage device 614 that may be composed of one or more types of removable storage and/or one or more types of non-removable storage. The data storage device 614 includes a computer-readable storage medium 616 on which is stored one or more sets of instructions embodying any one or more of the methodologies or functions described herein. Instructions for the program modules 610 may reside, completely or at least partially, within the computer readable storage medium 616, system memory 606 and/or within the processor(s) 630 during execution thereof by the user device 600, the system memory 606 and the processor(s) 630 also constituting computer-readable media. The user device 600 may also include one or more input devices 618 (keyboard, mouse device, specialized selection keys, etc.) and one or more output devices 620 (displays, printers, audio output mechanisms, etc.).

The user device 600 further includes one or more wireless modems 622 to enable the user device 600 to communicate via one or multiple types of wireless networks with other computing devices, such as remote computers, servers, and so forth. The wireless modems 622 may allow the user device 600 to handle both voice and non-voice communications (such as communications for text messages, multimedia messages, media downloads, web browsing, etc.) with a wireless communication system. The wireless modems 622 may provide network connectivity using any type of mobile network technology including, for example, cellular digital packet data (CDPD), general packet radio service (GPRS), enhanced data rates for GSM evolution (EDGE), universal mobile telecommunications system (UMTS), 6 times radio transmission technology (1xRTT), evaluation data optimized (EVDO), high-speed down-link packet access (HSDPA), WiFi, long term evolution (LTE), worldwide interoperability for microwave access (WiMAX), etc. Each of the wireless modems 622 may be configured to transmit data via wireless transmission protocol.

The wireless modems 622 may generate signals and send these signals to one or more antennas 684. The antennas 684 may be directional, omnidirectional or non-directional antennas. In addition to sending data, antennas 684 may also receive data, which is sent to wireless modems 622 and transferred to processors 630. Each of the wireless modems 622 may be configured to transmit data via a different antenna 684.

In one embodiment, user device 600 includes a GPS receiver 686. The GPS receiver 636 is configured to receive GPS signals from multiple different GPS satellites. The GPS receiver 686 then uses the information included in these GPS signals to determine a current location of the user device 600. The GPS receiver 686 is coupled to an antenna 688, which enables the GPS receiver 636 to receive the GPS signals.

In one embodiment, user device 600 includes one or more sensors 666, such as a physical contact sensor or proximity sensor. The sensors 666 can detect the presence of human body parts or other objects, and convey information regarding the detected presence to processor(s) 630. In one embodiment, the sensors 666 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 666 may also be optical (e.g., infrared) sensors that use an emitter and receiver pair to detect the presence of opaque objects. Alternatively, the sensors 666 may be inductive sensors, which include an inductive loop.

The processor(s) 630 may include sensor circuitry 635 (e.g., sensor device drivers) that enables the processor(s) 630 to interpret signals received from the sensor(s) 666. In one embodiment, the sensors 666 output fully processed signals to the processor(s) 630. For example, the sensors 666 may output a distance, a detected/not detected signal, etc. using a single line interface or a multi-line interface. The processors 630 may use the sensor circuitry 635 to process and/or interpret the received data. If data is received from multiple sensors 666, processing the data may include averaging the data, identifying a maximum from the data, or otherwise combining the data from the multiple sensors. In one embodiment, in which the sensors 666 include a sensor array, numerous sensors, or a touch panel, processing the data includes determining where on the user device the human body part or object is located from multiple sensor readings.

In one embodiment, antenna 688 and/or antenna 684 are used as sensor pads (e.g., as sensor electrodes) for a sensor 666. The antennas 684, 688 may be conductive structures that include various components that enable the antennas 688 to have different properties for signals having different frequencies. For example, the antenna 688 may appear as a loop antenna for signals having frequencies in the kHz frequency range (e.g., GPS signals), and may appear as a sensor pad for signals having frequencies in the kHz frequency range (e.g., proximity sensor signals). In one embodiment, antenna 684 and antenna 688 are combined into a single antenna. The wireless modem 622, GPS receiver 686 and sensor 666 may all concurrently use the single antenna. In one embodiment, the GPS receiver 686 is connected to the antenna 688 via a capacitor as described above, and the sensor 666 is connected to the antenna 688 via an indictor as described above. Similarly, the wireless modem 622 may be connected to the antenna 688 via a circuit that separates out frequencies in the MHz range from frequencies in the kHz range and frequencies in the GHz range (e.g., a band pass filter). This may enable the wireless modem 622, GPS receiver 686 and sensor 666 to all use the antenna 688 concurrently without interfering with each other.

Figure 7:
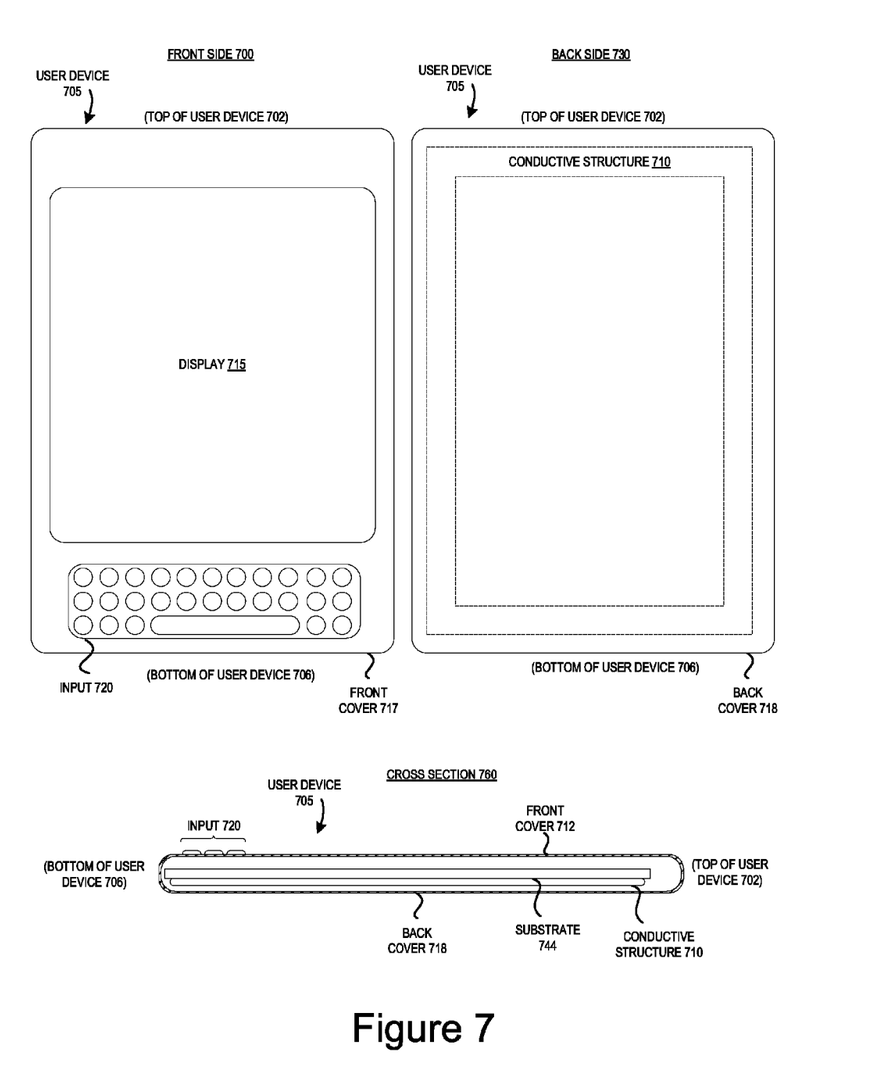
FIG. 7 illustrates an example of a front side view, a back side view and a cross-sectional side view of one embodiment of a user device.

FIG. 7 illustrates a front side view 700, a back side view 730 and a cross-sectional side view 760 of a user device 705, in accordance with one embodiment of the present invention. The front side 700 includes a display 715 and optionally an input 720 housed in a front cover 712. The display 715 may use any available display technology, such as electronic ink (e-ink), liquid crystal display (LCD), transflective LCD, light emitting diodes (LED), laser phosphor displays (LSP), and so forth. The input 720 may include a keyboard, touch pad, or other input mechanism. In one embodiment, the display 715 and input 720 are combined into one or more touch screens.

Disposed inside the user device 705 is an antenna 710, as well as additional un-illustrated components (e.g., a processor, GPS receiver, wireless modem, proximity sensor, etc.). As shown, the antenna 710 is positioned inside of a back cover of the user device 705 and covers a periphery of the user device 705. However, the conductive structure 710 may also be positioned at other locations and have different geometries than those shown. In one embodiment, the conductive structure 710 is attached to an underside of a non-conductive substrate 744, which may be a rigid substrate (e.g., a printed circuit board (PCB)) or a flexible substrate (e.g., a polyimide film, polyester film, or polyether ether ketone (PEEK) film). Alternatively, the conductive structure 710 may be attached to an inside of the back cover 718. In other embodiments, the conductive structure 710 may be positioned within the back cover 718 such that it is flush with the outer perimeter of the back cover 718, protrudes outside of the back cover 718 or recedes within the back cover 718. The conductive structure 710 may also be attached to a front of the non-conductive substrate 744 (e.g., a PCB) or to an inside of the front cover 712.

The conductive structure 710 may act as a sensor pad for the proximity sensor and as an antenna for the GPS receiver. Additionally, or in the alternative, the conductive structure 710 may act as an antenna for one or more wireless modems (e.g., for a LTE wireless modem and for a GSM wireless modem).

In one embodiment, in which the conductive structure 710 acts as an antenna for a wireless modem, the wireless modem may reduce a transmission power or stop transmitting when a human body part is detected within a threshold distance from the conductive structure 710. In one embodiment, the same conductive structure 710 that acts as the transmission antenna for the wireless modem also acts as a sensor pad for a proximity sensor. Therefore, the conductive structure 710 can be used to provide information that the wireless modem can use to control the strength of transmission. The same conductive structure 710 may also act as an antenna for a GPS receiver.

Figure 8:
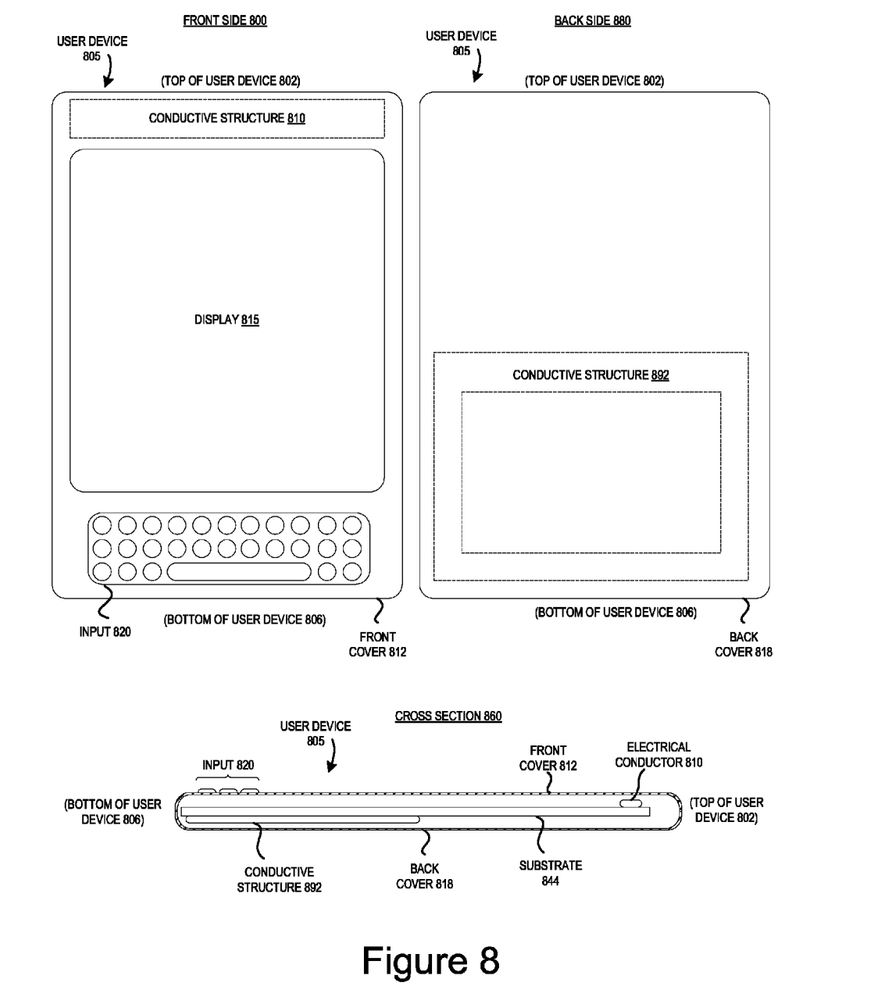
FIG. 8 illustrates an example of a front side view, a back side view and a cross-sectional side view of another embodiment of a user device.

FIG. 8 illustrates a front side view 800, a back side view 830 and a cross-sectional side view 860 of a user device 805, in accordance with another embodiment of the present invention. The front side 800 includes a display 815 and optionally an input 820 housed in a front cover 812. Disposed inside the user device 805 is a conductive structure 810 and an additional conductive structure 892, as well as additional un-illustrated components (e.g., a processor, GPS receiver, wireless modem, proximity sensor, etc.). As shown, conductive structure 892 is positioned inside of a back cover of the user device 805 near a bottom 806 of the user device. Conductive structure 810 is positioned inside a front cover 812 of the user device 805 near a top of the user device 805. However, the conductive structure 810 may also be positioned at other locations and have different geometries than those shown.

The conductive structure 892 may act as a sensor pad for the proximity sensor and as an antenna for the GPS receiver. Conductive structure 810 may act as an antenna for a wireless modem (e.g., for a LTE wireless modem) and as a sensor pad for the proximity sensor.

Figure 9:
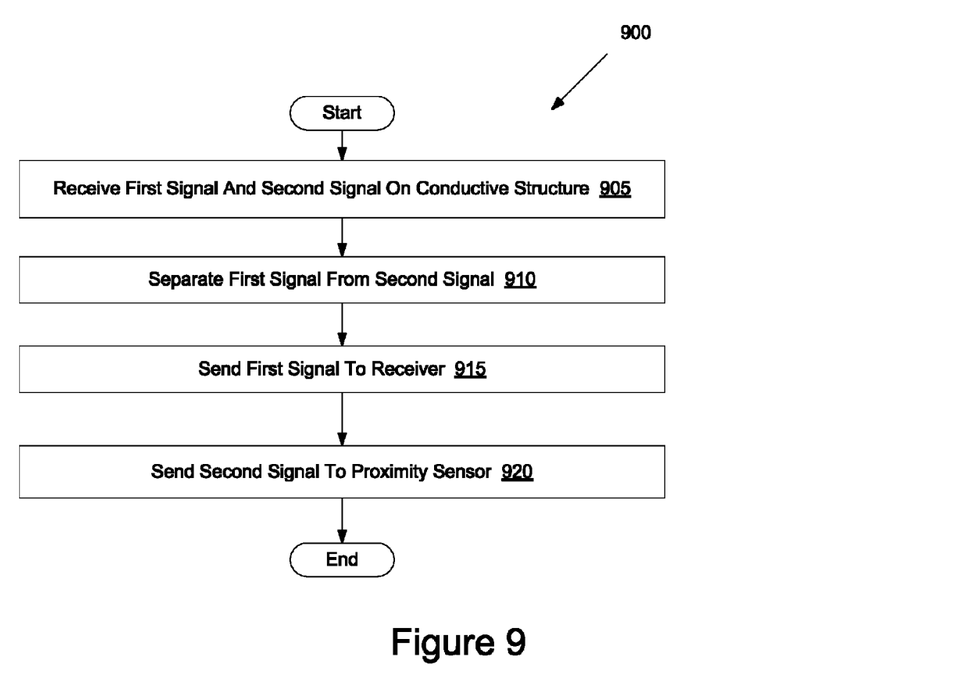
FIG. 9 is a flow diagram of an embodiment for a method of using a conductive structure as both an antenna and a sensor pad.

FIG. 9 is a flow diagram of an embodiment for a method 900 of using a conductive structure as both an antenna and a sensor pad. At block 905 of method 900 a conductive structure receives a first signal and a second signal. The first signal may be a proximity sensor signal, and the second signal may be a GPS signal or wireless communication signal (e.g., a GSM signal, LTE signal, etc.).

At block 910, the conductive structure separates the first signal from the second signal using a combination of inductors and capacitors.

In one embodiment, the conductive structure includes a capacitor that blocks the proximity sensor signal and/or other signals in the kHz frequency range, and passes the GPS signal, wireless communication signal, or other signals in the MHz to GHz frequency ranges. The capacitor may connect the conductive structure to a receiver or transceiver, such as a GPS receiver, a wireless communication transceiver, or other wireless receiver. Thus, the capacitor may be used to isolate the receiver or transceiver from the proximity sensor signal and other signals in the kHz frequency range. Accordingly, at block 915 the conductive structure sends the first signal to the receiver (or transceiver) via the capacitor.

In one embodiment, the conductive structure includes an inductor that blocks the GPS signal, wireless communication signal and/or other signals in the MHz to GHz frequency ranges, and passes the proximity sensor signal and/or other signals having frequencies in the kHz frequency range. The inductor may connect the conductive structure to a proximity sensor. Thus, the inductor may isolate the proximity sensor from the GPS signal and other signals in the MHz to GHz frequency ranges. Accordingly, at block 920, the conductive sensor passes the second signal to the proximity sensor via the inductor.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "separating", "sending", "isolating", "filtering" or the like, refer to the actions and processes of a computer system or electrical circuit.

Some portions of the detailed description are presented in terms of methods. These methods may be performed by processing logic that may comprise hardware (circuitry, dedicated logic, etc.), software (such as is run on a general purpose computer system or a dedicated machine), or a combination of both. In certain embodiments, the methods are performed by a user device, such as user device 600 of FIG. 6.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A mobile device comprising:
a global positioning system (GPS) receiver;
a proximity sensor; and
a conductive structure configured to operate as an antenna for the GPS receiver and as a sensor pad for the proximity sensor, wherein the conductive structure is coupled to the GPS receiver by a capacitor having a capacitance between 0.2 picofarads (pF) and 1.0 pF, and wherein the conductive structure is coupled to the proximity sensor by an inductor having an inductance that is above 22 nanohenries (nH).

2. The mobile device of claim 1, wherein the proximity sensor comprises at least one of a capacitive sensor, an inductive sensor, or a restive sensor.

3. The mobile device of claim 1, wherein the conductive structure comprises a first plate and a second plate, and wherein the second plate has a different orientation than the first plate.

4. The mobile device of claim 3, wherein the second plate is perpendicular to the first plate.

5. The mobile device of claim 1, wherein the conductive structure comprises at least one curved plate that is usable by the proximity sensor to sense the approach of objects from a plurality of directions.

6. A user device comprising:
a receiver;
a sensor;

a capacitor coupled to the sensor, the capacitor having a capacitance that causes the capacitor to pass signals having frequencies in a megahertz (MHz) to gigahertz (GHz) frequency range and to block signals having frequencies in a kilohertz (kHz) frequency range; and a conductive structure coupled to the receiver via the capacitor and to the sensor, wherein the conductive structure is configured to operate as an antenna for the receiver and as a sensor pad for the sensor.

7. The user device of claim 6, wherein the capacitance of the capacitor is 0.2 picofarads (pF) to 1.0 pF.

8. The user device of claim 6, further comprising a second capacitor that grounds the conductive structure for the signals having frequencies in the MHz to GHz frequency range.

9. The user device of claim 6, further comprising:
an inductor, wherein the conductive structure is coupled to the sensor via the inductor, the inductor having an inductance that causes the inductor to block signals having frequencies in the megahertz (MHz) to gigahertz (GHz) frequency range and to pass signals having frequencies in a kilohertz (kHz) frequency range.

10. The user device of claim 9, wherein the inductance of the inductor is above nanohenries (nH).

11. The user device of claim 6, wherein the conductive structure has resonant frequencies of 1.57542 gigahertz (GHz) and 1.2276 GHz.

12. The user device of claim 6, wherein the receiver is at least one of a global positioning system (GPS) receiver or a wireless receiver, and wherein the sensor is at least one of touch sensor or a proximity sensor.

13. The user device of claim 6, wherein the sensor is at least one of a capacitive sensor, an inductive sensor, or a resistive sensor.

14. The user device of claim 6, wherein the conductive structure comprises a first plate and a second plate, and wherein the second plate has a different orientation than the first plate.

15. The user device of claim 14, wherein the second plate is perpendicular to the first plate.

16. The user device of claim 6, wherein the conductive structure comprises at least one curved plate that is usable by the proximity sensor to sense the approach of objects from a plurality of directions.

17. A method comprising:
receiving, by a conductive structure in a user device, a first signal having a first frequency;
receiving, by the conductive structure, a second signal having a second frequency;
propagating, by the conductive structure, the first signal to a first electronic component, wherein the first signal is substantially free from interference from the second signal; and
propagating, by the conductive structure, the second signal to a second electronic component, wherein the second signal is substantially free from interference from the first signal.

18. The method of claim 17, wherein the first signal and the second signal are received concurrently.

19. The method of claim 17, wherein the first electronic component is a global positioning system (GPS) receiver and the second electronic component is a proximity sensor.

20. The method of claim 17, further comprising:
isolating the first electronic component from the second signal using a capacitor having a capacitance that causes the capacitor to pass the first signal to the first electronic component and to block the second signal from the first electronic component.

21. The method of claim 17, further comprising:
isolating the second electronic component from the first signal using an inductor having an inductance that causes the inductor to block the first signal from the second electronic component and to pass the second signal to the second electronic component.

22. The method of claim 17, wherein the first signal has a frequency in a megahertz (MHz) to gigahertz (GHz) frequency range and the second signal has a frequency in a kilohertz (kHz) frequency range.

* * * * *